(12) United States Patent
Lee et al.

(10) Patent No.: US 8,036,286 B2
(45) Date of Patent: Oct. 11, 2011

(54) SIGNAL GENERATION USING PHASE-SHIFT BASED PRE-CODING

(75) Inventors: Moon-Il Lee, Gyeonggi-Do (KR); Bin-Chul Ihm, Gyeonggi-Do (KR); Jin-Young Chun, Seoul (KR); Jae-Won Chang, Gyeonggi-Do (KR); Jin-Hyuk Jung, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 546 days.

(21) Appl. No.: 11/754,873

(22) Filed: May 29, 2007

(65) Prior Publication Data
US 2007/0274411 A1 Nov. 29, 2007

Related U.S. Application Data

(60) Provisional application No. 60/803,340, filed on May 26, 2006.

(30) Foreign Application Priority Data

Jul. 12, 2006 (KR) .................. 10-2006-0065303
Oct. 2, 2006 (KR) .................. 10-2006-0097216

(51) Int. Cl.
*H04K 1/10* (2006.01)
(52) U.S. Cl. ........ 375/260; 375/219; 375/267; 375/285; 375/299; 375/306; 375/307; 375/308; 375/316; 375/324; 375/340; 375/347; 375/349; 455/101
(58) Field of Classification Search .................. 375/260, 375/267, 219, 295, 299, 285, 306–307, 308, 375/316, 324, 340, 347, 349; 455/101
See application file for complete search history.

(56) References Cited

U.S. PATENT DOCUMENTS

| | | | |
|---|---|---|---|
| 6,298,092 B1 | 10/2001 | Heath, Jr. et al. | |
| 6,760,882 B1 | 7/2004 | Gesbert et al. | |
| 6,891,897 B1 * | 5/2005 | Bevan et al. | 375/265 |
| 7,583,982 B2 * | 9/2009 | Olesen et al. | 455/562.1 |
| 7,609,613 B2 * | 10/2009 | Aghvami et al. | 370/208 |
| 7,620,019 B1 | 11/2009 | Smith et al. | |
| 7,636,297 B1 * | 12/2009 | Lee et al. | 370/208 |
| 7,702,029 B2 | 4/2010 | Kotecha et al. | |

(Continued)

FOREIGN PATENT DOCUMENTS

EP 1087545 3/2001

(Continued)

OTHER PUBLICATIONS

Ludovic, C. et al.; "Optimal Minimum Distance-Based Precoder for MIMO Spatial Multiplexing Systems"; IEEE Transactions on Signal Processing; Mar. 2004; vol. 52, No. 3, pp. 617-627; XP011107796.

(Continued)

*Primary Examiner* — Chieh M Fan
*Assistant Examiner* — Sophia Vlahos
(74) *Attorney, Agent, or Firm* — Lee, Hong, Degerman, Kang & Waimey

(57) ABSTRACT

A phase-shift based pre-coding scheme used in a transmitting side and a receiving side that has less complexity than those of a space-time coding scheme, that can support various spatial multiplexing rates while maintaining the advantages of the phase-shift diversity scheme, that has less channel sensitivity than that of the pre-coding scheme, and that only requires a low capacity codebook is provided.

4 Claims, 11 Drawing Sheets

Use 2 antennas
Spatial Multiplexing Rate 1

Use 2 antennas
Spatial Multiplexing Rate 2

Use 4 antennas
Spatial Multiplexing Rate 1

Use 4 antennas
Spatial Multiplexing Rate 2

U.S. PATENT DOCUMENTS

| | | | |
|---|---|---|---|
| 7,729,432 B2 | 6/2010 | Khan et al. | |
| 7,813,330 B2 | 10/2010 | Yu et al. | |
| 7,839,944 B2 | 11/2010 | Lee et al. | |
| 2003/0048753 A1 | 3/2003 | Jalali | |
| 2003/0147343 A1* | 8/2003 | Onggosanusi et al. | 370/209 |
| 2004/0192218 A1 | 9/2004 | Oprea | |
| 2005/0041751 A1* | 2/2005 | Nir et al. | 375/267 |
| 2005/0201307 A1 | 9/2005 | Chae et al. | |
| 2005/0281350 A1 | 12/2005 | Chae et al. | |
| 2006/0013186 A1 | 1/2006 | Agrawal et al. | |
| 2006/0013328 A1 | 1/2006 | Zhang et al. | |
| 2006/0039489 A1* | 2/2006 | Ikram et al. | 375/260 |
| 2006/0039500 A1 | 2/2006 | Yun et al. | |
| 2006/0067277 A1 | 3/2006 | Thomas et al. | |
| 2006/0067443 A1 | 3/2006 | Liu et al. | |
| 2006/0093062 A1 | 5/2006 | Yun et al. | |
| 2006/0098568 A1 | 5/2006 | Oh et al. | |
| 2006/0098760 A1 | 5/2006 | Shen et al. | |
| 2006/0140294 A1* | 6/2006 | Hottinen et al. | 375/260 |
| 2006/0146692 A1* | 7/2006 | Gorokhov et al. | 370/208 |
| 2006/0270360 A1 | 11/2006 | Han et al. | |
| 2007/0041457 A1* | 2/2007 | Kadous et al. | 375/260 |
| 2007/0097856 A1* | 5/2007 | Wang et al. | 370/210 |
| 2007/0133707 A1* | 6/2007 | Hwang et al. | 375/267 |
| 2007/0147543 A1* | 6/2007 | Horng et al. | 375/299 |
| 2007/0149180 A1 | 6/2007 | Lin et al. | |
| 2007/0165738 A1 | 7/2007 | Barriac et al. | |
| 2007/0189416 A1 | 8/2007 | Kim et al. | |
| 2007/0263746 A1 | 11/2007 | Son | |
| 2007/0280373 A1 | 12/2007 | Lee et al. | |
| 2007/0286302 A1* | 12/2007 | Hwang et al. | 375/267 |
| 2007/0291638 A1 | 12/2007 | Chae et al. | |
| 2007/0297529 A1 | 12/2007 | Zhou et al. | |
| 2008/0063115 A1 | 3/2008 | Varadarajan et al. | |
| 2008/0069031 A1 | 3/2008 | Zhang et al. | |
| 2008/0080637 A1 | 4/2008 | Khan et al. | |
| 2008/0108310 A1 | 5/2008 | Tong et al. | |
| 2008/0198946 A1 | 8/2008 | Lee et al. | |
| 2008/0205533 A1 | 8/2008 | Lee et al. | |
| 2008/0240274 A1 | 10/2008 | Han et al. | |
| 2008/0256163 A1 | 10/2008 | Clerckx et al. | |
| 2008/0303699 A1 | 12/2008 | Zhang et al. | |
| 2009/0003466 A1 | 1/2009 | Taherzadehboroujeni et al. | |
| 2009/0003485 A1 | 1/2009 | Li et al. | |
| 2009/0110114 A1 | 4/2009 | Onggosanusi et al. | |
| 2009/0296844 A1 | 12/2009 | Ihm et al. | |
| 2009/0316807 A1 | 12/2009 | Kim et al. | |
| 2010/0027696 A1 | 2/2010 | Lee et al. | |
| 2010/0074309 A1 | 3/2010 | Lee et al. | |

FOREIGN PATENT DOCUMENTS

| | | |
|---|---|---|
| EP | 1538772 | 6/2005 |
| EP | 1655874 | 5/2006 |
| KR | 10-2006-0028989 | 4/2006 |
| KR | 10-2006-0038812 | 5/2006 |
| KR | 10-2006-0064501 | 6/2006 |
| KR | 10-2006-0130062 | 12/2006 |
| KR | 10-0715582 | 4/2007 |
| KR | 1020070068300 | 6/2007 |
| KR | 10-2008-0036499 | 4/2008 |
| KR | 10-0918747 | 9/2009 |
| RU | 2238611 | 10/2004 |
| RU | 2005-101422 | 8/2005 |
| RU | 2351071 | 1/2006 |
| RU | 2005115857 | 1/2006 |
| RU | 2292116 | 1/2007 |
| TW | 589818 | 6/2004 |
| TW | 200611519 | 4/2006 |
| WO | 2004-038952 | 5/2004 |
| WO | 2004/064311 | 7/2004 |
| WO | 2004073224 | 8/2004 |
| WO | 2005/0122516 | 12/2005 |
| WO | 2005/125044 | 12/2005 |
| WO | 2006002550 | 1/2006 |
| WO | 2006/019250 | 2/2006 |
| WO | 2006049417 | 5/2006 |
| WO | 2007094832 | 8/2007 |

OTHER PUBLICATIONS

Chan S. et al.; Asymptotically Minimum BER Linear Block Precoders for MMSE Equalisation; IEEE Proceedings: Communications; Aug. 21, 2004, Journal Article, vol. 151, No. 4, pp. 297-304; XP0006022313.

Athaudage, C.R.N., et al.; "An Efficient Framework to Exploit Frequency Diversity in OFDM: Precoding With Adaptive Subcarrier Selection"; The 17th Annual IEEE Int'l Symposium on Personal, Indoor, Mobile Radio Communications; Sep. 11, 2006.

Wang, J., et al.; "Method and Apparatus for Pre-Coding"; U.S. Appl. No: 60/731,301; Oct. 28, 2005.

NTT Docomo, 'Multi-Degree Cyclic Delay Diversity with Frequency-Domain Channel Dependent Scheduling', R1-062107, 3GPP TSG RAN WG1 Meeting #46, Aug. 28, 2006.

Samsung, Further details on adaptive cyclic delay diversity scheme, R1-051046, 3GPP TSG RAN WG1 Meeting #42bis, Oct. 10, 2005.

Samsung, 'System performance of adaptive cyclic delay diversity scheme', R1-051047, 3GPP TSG RAN WG1 Meeting #42bis, Oct. 10, 2005.

NTT Docomo, 'Multi-Degree Cyclic Delay Diversity with Frequency-domain Channel Dependent Scheduling', R1-060991, 3GPP TSG RAN WG1 Meeting #44bis, Mar. 26, 2006.

NTT Docomo, 'Channel Dependent Scheduling with Cyclic Delay Diversity', R1-061192, 3GPP TSG RAN WG1 Meeting #45, May 8, 2006.

Ericsson, 'Phase Shift based Precoding for Downlink MIMO Transmission', R1-071032, 3GPP TSG RAN WG1 #48, Feb. 12, 2007.

NTT Docomo, 'CDD-Based Pre-coding Scheme for Rank = 1 and 2 ', R1-062732, 3GPP TSG RAN WG1 Meeting #46bis, Oct. 9, 2006.

LG Electronics, 'Generalized CDD scheme for E-UTRA downlink MIMO', R1-062314, 3GPP TSG RAN WG1 Meeting #46, Aug. 28, 2006.

LG Electronics, et al., 'CDD-based Precoding for E-UTRA downlink MIMO', R1-063345, 3GPP TSG RAN WG1 Meeting #47, Nov. 6, 2006.

LG Electronics, et al., 'CDD-based Precoding for Open-loop E-UTRA downlink MIMO', R1-063346, 3GPP TSG RAN WG1 Meeting #47, Nov. 6, 2006.

ETRI, 'Combined spatial multiplexing and CSD transmission for rate 2 with 4 transmit antennas', R1-060828, 3GPP TSG RAN WG1 Meeting #44bis, Mar. 27, 2006.

Bauch et al., "Orthogonal Frequency Division Multiple Access with Cycile Delay Diversity", IEEE ITG Workshop on Smart Antennas, pp. 17-24, Mar. 2004.

Zhang, J., "MIMO Wireless Precoding System Robust to Power Imbalance," U.S. Appl. No. 60/929,025, Jun. 8, 2007.

* cited by examiner

Prior Art

Prior Art

Prior Art

SIGNAL GENERATION USING PHASE-SHIFT BASED PRE-CODING

CROSS REFERENCE TO RELATED APPLICATION

Pursuant to 35 U.S.C. §119, this application claims the benefit of earlier filing date and right of priority to Provisional Application No. 60/803,340, filed on May 26, 2006, Korea Application No. 10-2006-65303, filed Jul. 12, 2006, Korean Application No. 10-2006-97216, filed Oct. 2, 2006, the contents of which are hereby incorporated by reference herein in their entirety.

BACKGROUND

This disclosure relates to signal generation using phase-shift based pre-coding.

Certain multi-carrier based wireless access techniques do not adequately support mobile communication systems with various types of antenna structures.

The present inventors recognized certain shortcomings related to certain multi-carrier based multiple antenna transmitting and/or receiving techniques. Based upon such recognition, the following features have been conceived.

BRIEF DESCRIPTION

A phase-shift based pre-coding scheme used in a transmitting side and a receiving side that has less complexity than those of a space-time coding scheme, that can support various spatial multiplexing rates while maintaining the advantages of the phase-shift diversity scheme, that has less channel sensitivity than that of the pre-coding scheme, and that only requires a low capacity codebook has been conceived and provided herein. In particular, the matrix used for performing phase-shift based pre-coding can be more easily expanded and implemented according to any changes in the number of antennas being employed.

DETAILED DESCRIPTION

Information communication services have become more popular and with the introduction of various multimedia services and high quality services, there is an increased demand for enhanced wireless (radio) communication services. In order to actively meet such demands, the capacity and data transmission reliability of the communication system should be increased. To increase communication capacity in a wireless (radio) communication environment, one method would be to find newly usable bandwidth and another would be to improve the efficiency of given resources. As some examples of the latter method, multiple antenna transmitting/receiving (transceiving) techniques are recently gaining attention and being actively developed, whereby a plurality of antennas are provided at the transceiver in order to obtain diversity gain by additionally securing spatial domain for resource utilization, or increasing transmission capacity by transmitting data in parallel via each antenna.

Figure 1:
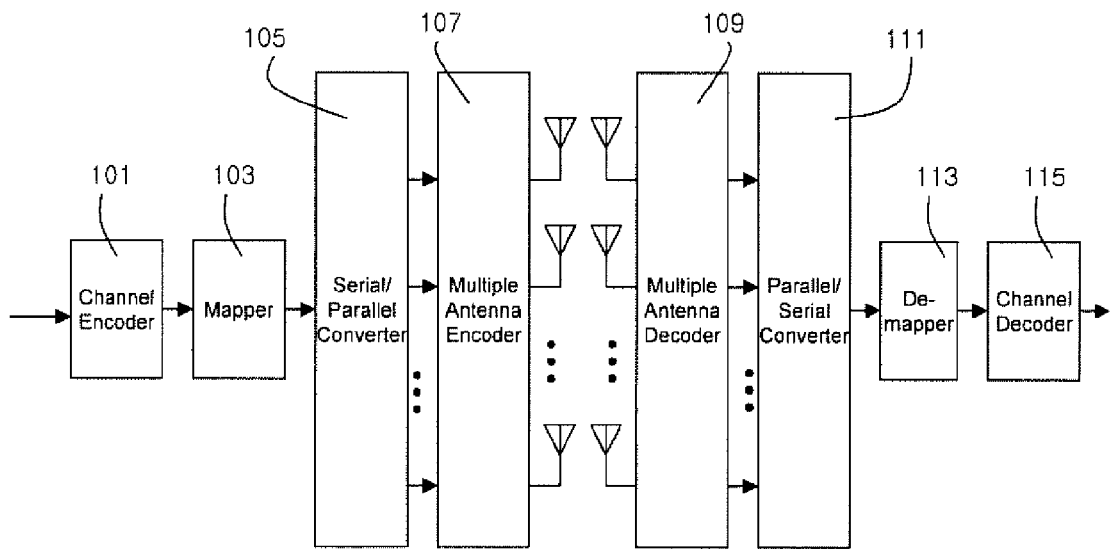
FIG. 1 shows an exemplary structure of a Multiple-Input Multiple-Output (MIMO) system using Orthogonal Frequency Division Multiplexing (OFDM).

Among such multiple antenna transceiving techniques, an example would be Multiple-Input Multiple-Output (MIMO) system based on Orthogonal Frequency Division Multiplexing (OFDM), the general structure of which will now be explained with reference to FIG. 1.

At the transmitting side (or transmitter), a channel encoder 101 serves the purpose of reducing the effects due to the channel or noise by attaching repetitive bits to the transmission data bits. A mapper 103 changes the data bit information into data symbol information. A serial-to-parallel converter 105 changes serial inputs into parallel outputs for the purpose of MIMO processing on the data symbols. In the receiving side (or receiver), a multiple antenna decoder 109, a parallel-to-serial converter 111, a demapper 113, and a channel decoder 115 perform the opposite operations as those of the multiple antenna encoder 107, the serial-to-parallel converter 105, the mapper 103, and the channel encoder 10 of the transmitting side described above.

In a multiple antenna OFDM system, various techniques are necessary to increase transmission reliability. For example, space-time code (STC) techniques, cyclic delay diversity (CDD) techniques, antenna selection (AS) techniques, antenna hopping (AH) techniques, spatial multiplexing (SM) techniques, beam-forming (BF) techniques, precoding techniques, and the like may be employed. Among these techniques, some will be explained in more detail hereafter.

The space-time code (STC) technique, for a multiple antenna environment, relates to continuously (sequentially) transmitting the same signal, but in case of repetitive transmissions, transmitting through different antennas is performed, in order to obtain spatial diversity gain. The following matrix represents the most basic space-time code that is used in a system with two transmit antennas.

$$\frac{1}{\sqrt{2}} \begin{bmatrix} S_1 & -S_2^* \\ S_2 & S_1^* \end{bmatrix}$$

In the above matrix, the rows represent antennas and the columns represent time slots.

Such space-time code technique has some shortcoming. For example, respectively different forms of space-time codes are required according to how the antenna structure changes, the transmitting side and receiving side have increased complexity because data symbols are repeatedly transmitted through a plurality of time slots in order to obtain spatial diversity, and has respectively lower performance compared to that of other closed-loop systems because data is transmitted without using feedback information. Table 1 below shows the need for respectively different space-time codes according to antenna structures.

TABLE 1

| STC Scheme | Spatial Multiplexing Rate | # of Tx antennas |
|---|---|---|
| $\frac{1}{\sqrt{2}} \begin{bmatrix} S_1 & -S_2^* \\ S_2 & S_1^* \end{bmatrix}$ | 1 | 2 |
| $\frac{1}{\sqrt{2}} \begin{bmatrix} S_1 \\ S_2 \end{bmatrix}$ | 2 | 2 |
| $\frac{1}{\sqrt{2(1+r^2)}} \begin{bmatrix} S_1 + jr \cdot S_4 & r \cdot S_2 + S_3 \\ S_2 - r \cdot S_3 & jr \cdot S_2 + S_4 \end{bmatrix}$, $r = \frac{\sqrt{5} \pm 1}{2}$ | 2 | 2 |
| $\frac{1}{2} \begin{bmatrix} S_1 & S_2 & S_3 & S_4 \\ S_2^* & -S_1^* & S_4^* & -S_3^* \\ S_3 & -S_4 & -S_1 & S_2 \\ S_4^* & S_3^* & -S_2^* & -S_1^* \end{bmatrix}$ | 1 | 4 |

TABLE 1-continued

| STC Scheme | Spatial Multiplexing Rate | # of Tx antennas |
|---|---|---|
| $\frac{1}{\sqrt{2}} \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}$ | 1 | 4 |
| $\frac{1}{2} \begin{bmatrix} S_1 & -S_2^* & S_5 & -S_6^* \\ S_2 & S_1^* & S_6 & S_5^* \\ S_3 & -S_4^* & S_7 & -S_8^* \\ S_4 & S_3^* & S_8 & S_7^* \end{bmatrix}$ | 2 | 4 |

Cyclic Delay Diversity (CDD) is a method in which frequency diversity gain is obtained at the receiving side, by using the antennas to respectively transmit signals with different delays or different magnitudes when transmitting OFDM signals in a system having multiple transceiving antennas.

Figure 2:
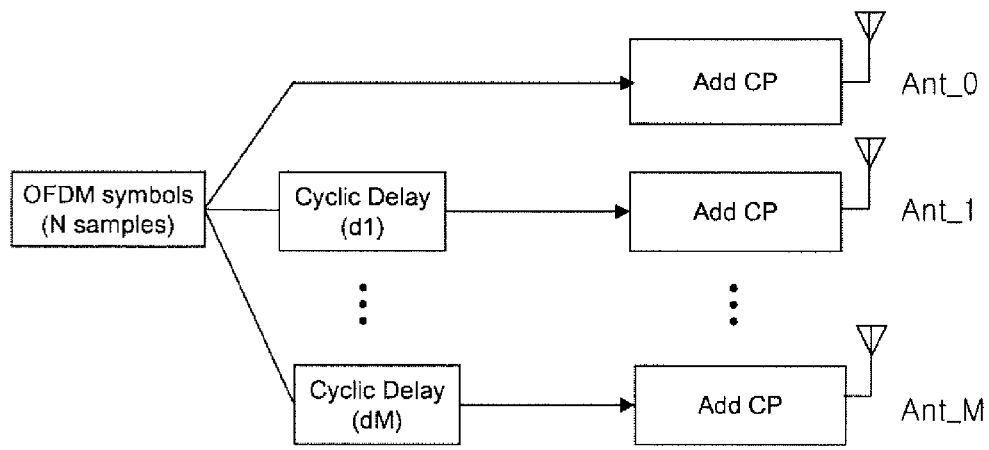
FIG. 2 shows an exemplary structure of a transmitting side for a multiple antenna system using the cyclic delay diversity method.

FIG. 2 shows a general structure of a transmitting side of a multiple antenna system using the cyclic delay diversity method.

Upon separating and delivering the OFDM symbols to each antenna via a serial-to-parallel converter and a multiple antenna encoder, an Inverse Fast Fourier Transform (IFFT) for changing a frequency domain signal into a time domain signal and a cyclic prefix (CP) for minimizing interference between channels are added and transmitted to the receiving side. Here, the data sequence delivered to the first antenna is transmitted to the receiving side as is (i.e., without any changes), while the data sequence transmitted from other transmit antennas is delayed in cyclic shift manner when compared to a first antenna.

Meanwhile, when such cyclic delay diversity scheme is implemented in the frequency domain, the cyclic delay may be mathematically expressed as a multiplication of phase sequences.

Figure 3:
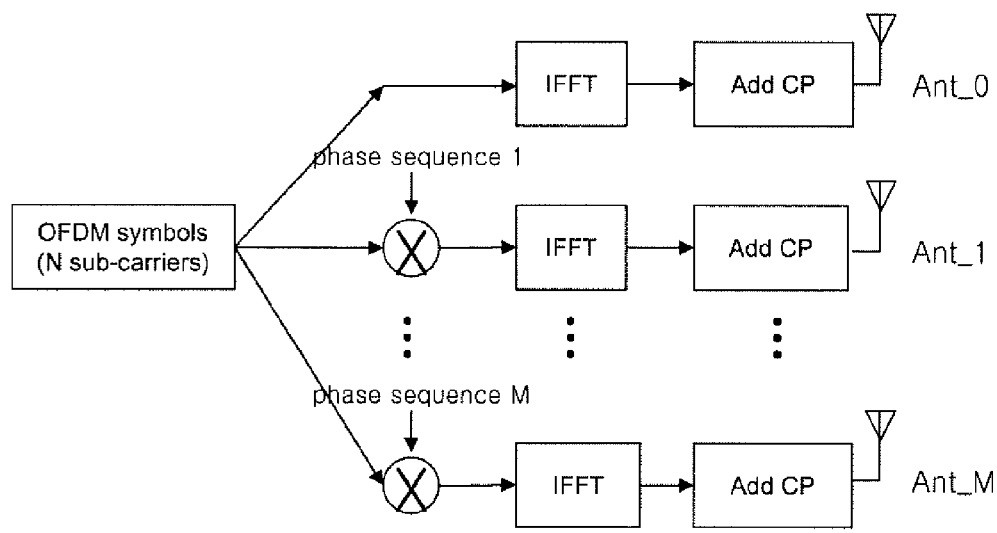
FIG. 3 shows an exemplary structure of a transmitting side for a multiple antenna system using the phase-shift diversity method.

Namely, as can be seen in FIG. 3, a particular phase sequence (e.g., phase sequence 1~phase sequence M) that has been set differently for each antenna is multiplied to each data sequence in the frequency domain, and upon performing IFFT (Inverse Fast Fourier Transform) processing, such can be transmitted to the receiving side. This is referred to as a phase-shift diversity scheme.

By using the phase-shift diversity method, the flat fading channel may be changed to a frequency selectivity channel, and frequency diversity gain or frequency scheduling gain may be obtained according to a cyclic delay sample.

Figure 4:
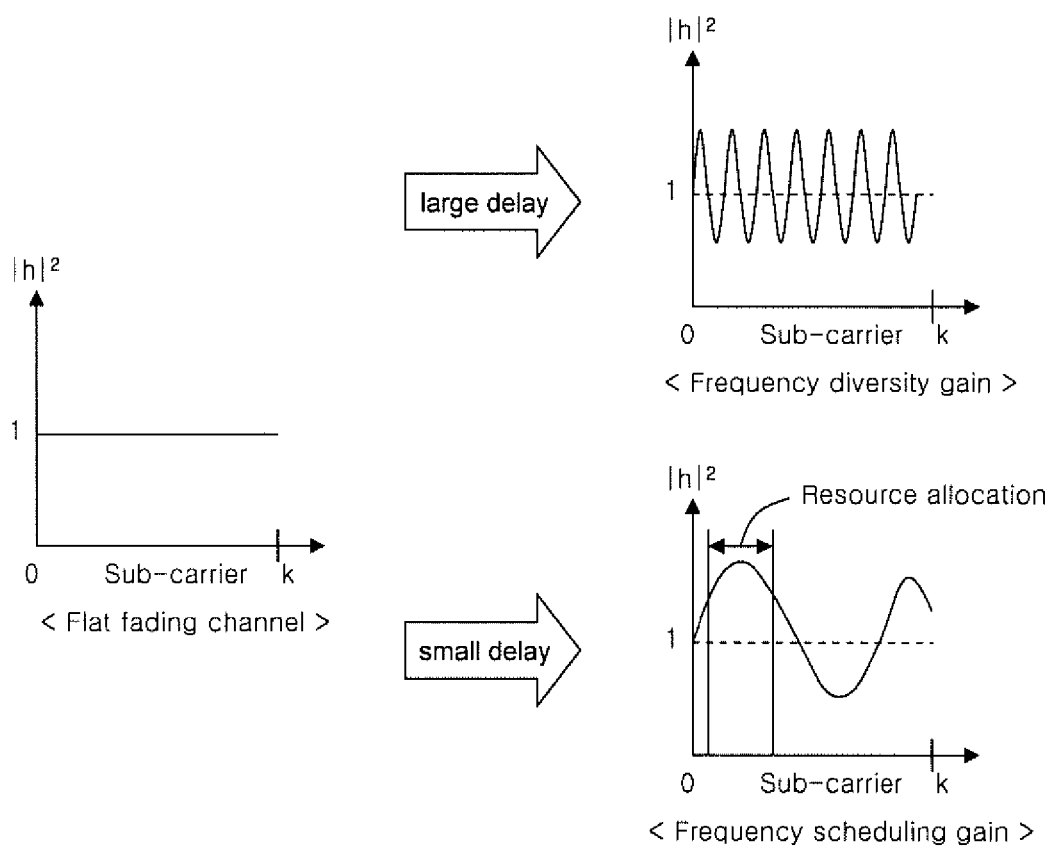
FIG. 4 is a graph showing examples of two types of phase-shift diversity methods.

Namely, as can be seen in FIG. 4, in the phase-shift diversity scheme, when generating a phase sequence by using a relatively large value cyclic delay sample, because the phase variation period is shortened (decreased), frequency selectivity is increased and as a result, the channel codes may exploit frequency diversity gain. Such is typically used in so-called open-loop systems.

Also, when a small value cyclic delay is used, the phase variation period is lengthened (increased), and by using this in a closed-loop system, resources are allocated to the most satisfactory channel region such that frequency scheduling gain can be obtained. Namely, as can be seen in FIG. 4, in the phase-shift diversity scheme, when a relatively small value cyclic delay is used for generating a phase sequence, certain sub-carrier regions of the flat fading channel result in an increase in channel magnitude, while other sub-carrier regions result in a decrease in channel magnitude. In such case, for an OFDMA system that accommodates multiple users, when a signal is transmitted through a sub-carrier having an increased channel magnitude per user, the signal-to-noise ratio can be increased.

However, despite some benefits of the above-described cyclic delay diversity scheme or phase-shift diversity scheme, because the spatial multiplexing rate is 1, the data transmission rate cannot be increased as desired.

The pre-coding scheme may include a codebook based pre-coding method used when there is a finite (or limited) amount of feedback information in a closed-loop system and may include a method of performing feedback upon quantization of channel information. Here, codebook based pre-coding refers to obtaining signal-to-noise ratio (SNR) gain by feeding back, to the transmitting side, an index of a pre-coding matrix that is already known by both the transmitting side and the receiving side.

Figure 5:
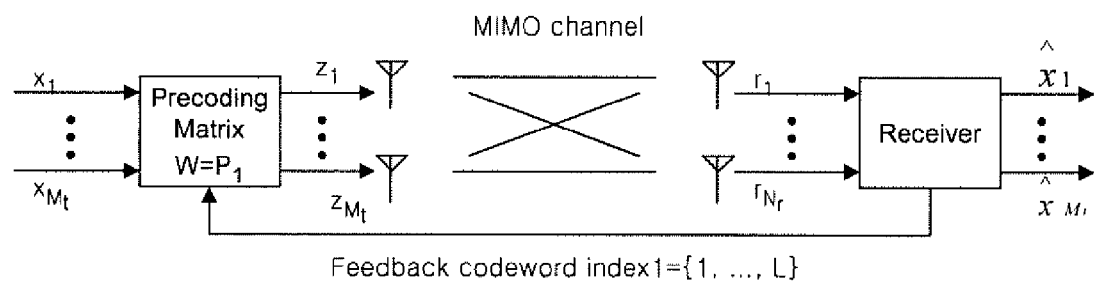
FIG. 5 shows an exemplary structure of a transmitting side for a multiple antenna system using a pre-coding method.

FIG. 5 depicts an exemplary structure of a transceiving side of a multiple antenna system using codebook based pre-coding. Here, the transmitting side and the receiving side respectively have a finite pre-coding matrix ($P_1 \sim P_L$), and at the receiving side, channel information is used to feed back an optimal pre-coding matrix index (I), while at the transmitting side, a pre-coding matrix corresponding to the fed back index is applied to transmission data ($x_1 \sim x_{Mt}$).

Such codebook based pre-coding scheme is beneficial in that effective data transmission is possible due to feedback of the index. However, because a stable channel is necessary, such codebook based pre-coding may not be fully appropriate for a mobile environment with severe channel changes. Also, some loss in the uplink transmission rate may occur due to the feedback overhead for the preceding matrix index. Additionally, because a codebook is needed in both the transmitting side and the receiving side, increased memory usage may be required.

The present inventors recognized at least the above-described issues in certain data transmission, reception, and processing techniques for multiple antenna systems. Based upon such recognition, the following features have been conceived to address and/or to solve such issues.

This disclosure relates to and claims priority benefit of U.S. Provisional Application No. 60/803,340 (filed May 26, 2006), Korean Patent Application number 10-2006-0065303 (filed Jul. 12, 2006), and Korean Patent Application number 10-2006-0097216 (filed Oct. 2, 2006), which contents are specifically incorporated herein by reference.

The present disclosure relates to a phase-shift based pre-coding method of a multiple antenna system using a plurality of sub-carriers, as well as a generalized phase-shift based pre-coding method and a transceiver device supporting the same.

Hereafter, a phase-shift based pre-coding method will be explained with respect to a 2-antenna system and a 4-antenna system, and a method of forming a generalized phase-shift based pre-coding matrix to be extendedly used for a system with an $N_t$ number of (physical or virtual) antennas will be described.

Phase-shift Based Pre-coding Method

A phase-shift based pre-coding matrix (P) proposed herein may be generally expressed in the following manner:

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix} \quad \text{[Equation 1]}$$

Here, $w_{i,j}^k$, i=1, ..., $N_t$, j=1, ..., R refers to multiple complex weight values determined by sub-carrier index k, $N_t$ refers to the number of (physical or virtual) transmit antennas, and R refers to a spatial multiplexing rate. If the phase-shift based pre-coding matrix (P) is used in case of a physical antenna scheme, the $N_t$ may be number of antenna port. Such sub-carrier index k can be replaced by resource index including sub-band index. However, if P is used in case of a virtual antenna scheme, the $N_t$ may be a spatial multiplexing rate (i.e., R). Here, the multiple complex weight values may be different according to the OFDM symbol being multiplied to the antenna and according to the corresponding sub-carrier index. The multiple complex weight value may be determined according to at least one of a channel condition and whether feedback information exists or not.

The pre-coding matrix (P) of Equation 1 may be a unitary matrix for reducing the loss in channel capacity of a multiple antenna system. Here, to consider the conditions for forming a unitary matrix, the channel capacity of a multiple antenna system may be expressed by the following mathematical equation:

$$C_u(H) = \log_2\left(\det\left(I_{N_r} + \frac{SNR}{N}HH^H\right)\right) \quad \text{[Equation 2]}$$

Here, H refers to a multiple antenna channel matrix having a size of $N_r \times N_t$, and $N_r$ indicates the total number of receiving antennas. If a phase-shift based pre-coding matrix (P) is applied to the above Equation 2, the following may be obtained:

$$C_{precoding} = \log_2\left(\det\left(I_{N_r} + \frac{SNR}{N}HPP^H H^H\right)\right) \quad \text{[Equation 3]}$$

As shown in Equation 3, to minimize channel loss, $PP^H$ needs to be an identity matrix, thus the phase-shift based pre-coding matrix (P) should be a unitary matrix such as the following:

$$PP^H = I_{N_r} \quad \text{[Equation 4]}$$

In order for the phase-shift based pre-coding matrix (P) to be a unitary matrix, two conditions should be satisfied. Namely, a power constraint and an orthogonality constraint should be simultaneously satisfied. Here, the power constraint refers to making the size of each column of the matrix to equal one (1), and the orthogonality constraint refers to making orthogonal characteristics between each column of the matrix to be satisfied. The above matters may be expressed mathematically in the following manner:

$$|w_{1,1}^k|^2 + |w_{2,1}^k|^2 + \cdots + |w_{N_t,1}^k|^2 = 1,$$

$$|w_{1,2}^k|^2 + |w_{2,2}^k|^2 + \cdots + |w_{N_t,2}^k|^2 = 1,$$

$$\vdots$$

$$|w_{1,R}^k|^2 + |w_{2,R}^k|^2 + \cdots + |w_{N_t,R}^k|^2 = 1.$$

[Equation 5]

$$w_{1,1}^{k*}w_{1,2}^k + w_{2,1}^{k*}w_{2,2}^k + \cdots + w_{N_t,1}^{k*}w_{N_t,2}^k = 0$$

$$w_{1,1}^{k*}w_{1,3}^k + w_{2,1}^{k*}w_{2,3}^k + \cdots + w_{N_t,1}^{k*}w_{N_t,3}^k = 0$$

$$\vdots$$

$$w_{1,1}^{k*}w_{1,R}^k + w_{2,1}^{k*}w_{2,R}^k + \cdots + w_{N_t,1}^{k*}w_{N_t,R}^k = 0$$

[Equation 6]

As an exemplary embodiment, a generalized equation for a 2×2 phase-shift based pre-coding matrix will be provided, and a mathematical expression for satisfying the above-described two conditions will be examined. Equation 7 shows a generalized expression of a phase-shift based pre-coding matrix having a spatial diversity rate of 2 and having two transmit antennas.

$$P_{2\times 2}^k = \begin{pmatrix} \alpha_1 e^{jk\theta_1} & \beta_1 e^{jk\theta_2} \\ \beta_2 e^{jk\theta_3} & \alpha_2 e^{jk\theta_4} \end{pmatrix}$$

[Equation 7]

Here, $\alpha_i$, $\beta_i$ (i=1, 2) are real numbers, $\theta_j$ (j=1, 2, 3, 4) refers to phase values, and k is a sub-carrier index of the OFDM signal. In Equation 7, a relationship between a phase values $\theta_i$ (i=1, . . . , 4) of a frequency domain and a cyclic delay value $\tau_i$ (i=1, . . . , 4) of a time domain is expressed as follows:

$$\theta_i = -2\pi/N_{fft} \cdot \tau_i$$

where, $N_{fft}$ denotes the number of subcarriers of the OFDM signal.

It can be understood that by those skilled in the art that the description thus far may be modified and altered in various ways without departing from the technical scope of the present disclosure. Accordingly, the technical scope should not be limited to that described in the detailed description but should be embraced by the scope of the claims. In order to implement such pre-coding matrix as a unitary matrix, the power constraint of Equation 8 and the orthogonality constraint of Equation 9 should be satisfied.

$$|\alpha_1 e^{jk\theta_1}|^2 + |\beta_2 e^{jk\theta_3}|^2 = 1,$$

$$|\alpha_2 e^{jk\theta_4}|^2 + |\beta_1 e^{jk\theta_2}|^2 = 1,$$

[Equation 8]

$$(\alpha_1 e^{jk\theta_1})^* \beta_1 e^{jk\theta_2} + (\beta_2 e^{jk\theta_3})^* \alpha_2 e^{jk\theta_4} = 0,$$

[Equation 9]

Here, the superscript (*) denotes a conjugate complex number. An example of a 2×2 phase-shift based pre-coding matrix that satisfies the above Equations 7 through 9 may be expressed as follows:

$$P_{2\times 2}^k = \frac{1}{\sqrt{2}} \begin{pmatrix} 1 & e^{jk\theta_2} \\ e^{jk\theta_3} & 1 \end{pmatrix}$$

[Equation 10]

Here, $\theta_2$ and $\theta_3$ have the relationship as shown in Equation 11 due to the orthogonality limitations.

$$k\theta_3 = -k\theta_2 + \pi$$

[Equation 11]

The pre-coding matrix may be stored in the form of a so-called codebook (or some equivalent type of preceding scheme, etc.) within a memory (or other type of storage device) of the transmitting side and the receiving side. Such codebook may include various types of pre-coding matrices formed by using a finite number of respectively different $\theta_2$ values. Also, the $\theta_2$ value may be appropriately set according to the channel environment, transmission rank, system bandwidth and whether or not feedback information exists, and by setting the $\theta_2$ value to be relatively small (e.g., 2 cyclic delay samples) if feedback information is used or by setting the $\theta_2$ value is set to be relatively high (e.g., $N_{fft}/N_t$ cyclic to delay samples) if feedback information is not used, high frequency diversity gain may be obtained.

Even when a phase-shift based pre-coding matrix such as that of Equation 7 is formed, situations where the spatial multiplexing rate should be set to be small compared to the actual number of antennas according to the channel environment may occur. In such case, in the phase-shift based pre-coding matrix formed in the above manner, a particular number of columns corresponding to the current spatial multiplexing rate (i.e., the spatial multiplexing rate that was made smaller) may be selected to re-generate a new phase-shift based pre-coding matrix. Namely, a new pre-coding matrix applied to the corresponding system need not always be formed whenever the spatial multiplexing rate changes. Instead, the initially formed phase-shift based pre-coding matrix may be employed as is (i.e., without any changes), but one or more particular columns of the corresponding matrix may be selected to re-form the pre-coding matrix.

As one such example, the pre-coding matrix of the above Equation 10 assumes that the multiple antenna system has 2 transmit antennas with a spatial multiplexing rate of 2, but there may be some situations where the spatial multiplexing rate may actually be reduced to 1 for some particular reason. In such case, pre-coding may be performed by selecting a particular column from the matrix of Equation 10 above, and if the second column is selected, the phase-shift based pre-coding matrix is the same as that shown in Equation 12 below, and this becomes the same as the cyclic delay diversity scheme for two transmit antennas of the conventional art.

$$P_{2\times 1}^k = \frac{1}{\sqrt{2}} \begin{pmatrix} e^{jk\theta_2} \\ 1 \end{pmatrix}$$

[Equation 12]

Here, this example assumes a system having 2 transmit antennas, but such can also be expanded for applicability to systems with 4 (or more) antennas. Namely, after generating a phase-shift based pre-coding matrix for the case of 4 transmit antennas, pre-coding may be performed upon selecting one or more particular columns according to the changes in the spatial multiplexing rate.

Figure 6:
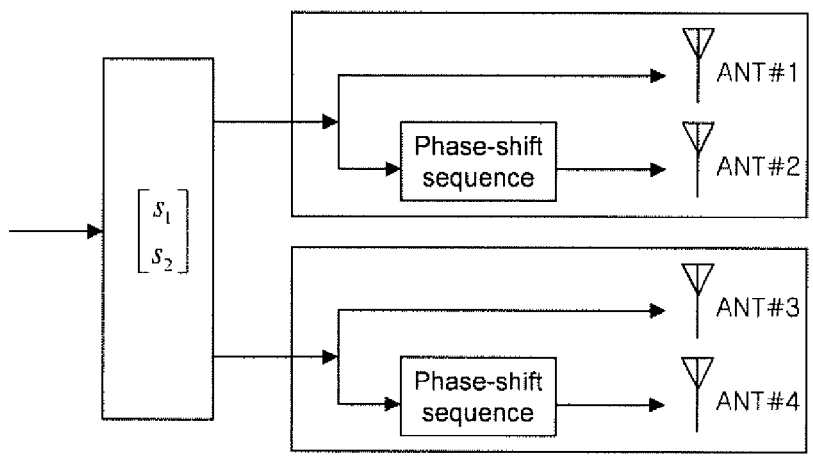
FIG. 6 shows the exemplary procedures in performing a phase-shift diversity method in a system having 4 antennas with a spatial multiplexing rate of 2.
Figure 7:
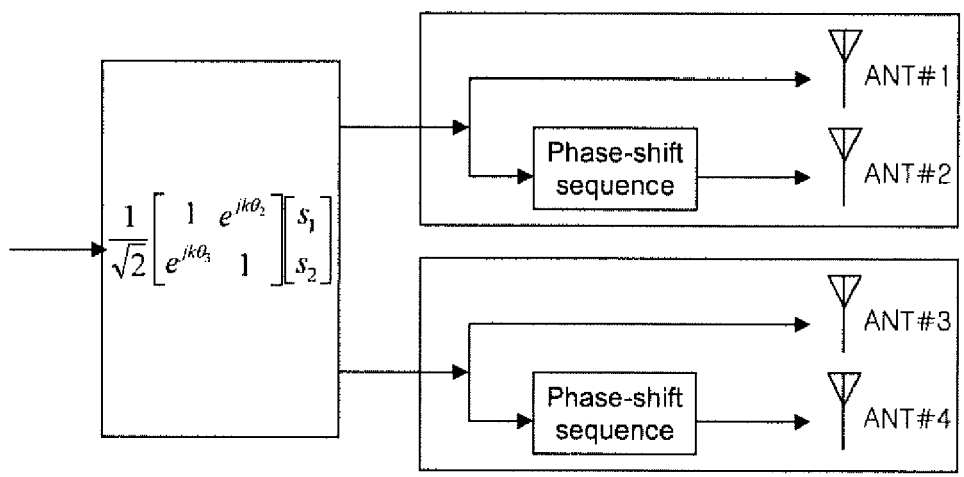
FIG. 7 shows an example of how a phase-shift based pre-coding method is applied to the system of FIG. 6.

As an example, FIG. 6 shows a case where the related art spatial multiplexing and cyclic delay diversity are applied to a multiple antenna system having 4 transmit antennas and with a spatial multiplexing rate of 2, while FIG. 7 shows a case where the phase-shift based pre-coding matrix of Equation 10 is applied to such a multiple antenna system.

According to FIG. 6, a $1^{st}$ sequence ($S_1$) and a $2^{nd}$ sequence ($S_2$) are delivered to the $1^{st}$ antenna and the $3^{rd}$ antenna, and a $1^{st}$ sequence ($s_1 e^{jk\Theta_1}$) and $2^{nd}$ sequence ($s_2 e^{jk\Theta_1}$) that have been phase-shifted by using phase sequence of $e^{jk\Theta_1}$ are delivered to the $2^{nd}$ antenna and the $4^{th}$ antenna. Accordingly, it can be understood that the overall spatial multiplexing rate is 2.

On the other hand, according to FIG. 7, $s_1+s_2 e^{jk\Theta 2}$ is delivered to the 1$^{st}$ antenna, $s_1 e^{jk\Theta 1}+s_2 e^{jk(\Theta 1+\Theta 2)}$ is delivered to the 2$^{nd}$ antenna, $s_1 e^{jk\Theta 3}+s_2$ is delivered to the 3$^{rd}$ antenna, and $s_1 e^{jk(\Theta 1+\Theta 3)}+s_2 e^{jk\Theta 1}$ is delivered to the 4$^{th}$ antenna. Thus, when compared to the system of FIG. 6, the advantage of the pre-coding method can be obtained, and because cyclic delay (or phase-shift) can be performed for 4 antennas by employing a uniform pre-coding matrix, the advantage of the cyclic delay diversity scheme can also be obtained.

As one of example, the above-described phase-shift based pre-coding matrices per different spatial multiplexing rates with respect to a 2-antenna system and a 4-antenna system may be defined as follows.

TABLE 2

| 2-antenna system | | 4-antenna system | |
|---|---|---|---|
| Spatial multiplexing rate 1 | Spatial multiplexing rate 2 | Spatial multiplexing rate 1 | Spatial multiplexing rate 2 |
| $\frac{1}{\sqrt{2}}\begin{pmatrix} 1 \\ e^{j\theta_1 k} \end{pmatrix}$ | $\frac{1}{\sqrt{2}}\begin{pmatrix} 1 & -e^{-j\theta_1 k} \\ e^{j\theta_1 k} & 1 \end{pmatrix}$ | $\frac{1}{\sqrt{4}}\begin{pmatrix} 1 \\ e^{j\theta_1 k} \\ e^{j\theta_2 k} \\ e^{j\theta_3 k} \end{pmatrix}$ | $\frac{1}{\sqrt{4}}\begin{pmatrix} 1 & -e^{-j\theta_1 k} \\ e^{j\theta_1 k} & 1 \\ e^{j\theta_2 k} & -e^{-j\theta_3 k} \\ e^{j\theta_3 k} & -e^{-j\theta_2 k} \end{pmatrix}$ |

Figure 8:
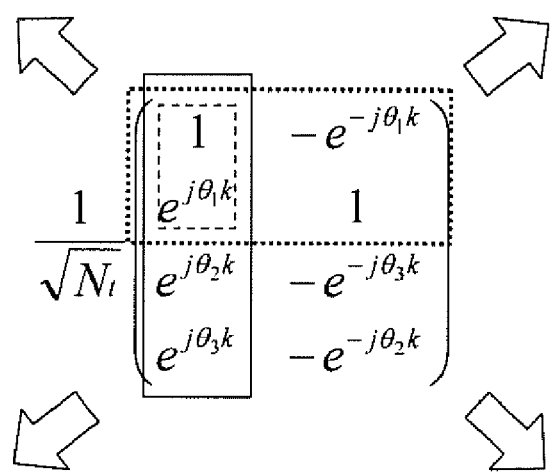
FIG. 8 shows an exemplary pre-coding matrix used in the phase-shift based pre-coding method for the system of FIG. 7.

Here, $\theta_j (j=1, 2, 3)$ refers to a phase angle according to the cyclic delay value, and k refers to an OFDM sub-carrier index. In Table 2 above, each pre-coding matrix of the four situations may be obtained by using a particular portion of the pre-coding matrix with respect to a multiple antenna system having 4 antennas with a spatial multiplexing rate of 2 (as can be seen in FIG. 8). Accordingly, each pre-coding matrix for such four situations need not be separately provided in a codebook, thus the memory resources in the transmitting side and the receiving side may be conserved.

Referring to Table 2, it should be noted that when forming an appropriate phase-shift based pre-coding matrix according to a changed spatial multiplexing rate, a new column that satisfies the orthogonal constraint to the other columns may be added.

Generalized Phase-shift Based Pre-coding Method

Thus far, the procedures of forming a phase-shift based pre-coding matrix when there are 4 transmit antennas with a spatial multiplexing rate of 2 was explained, but the phase-shift based pre-coding method of the present disclosure may be expanded to a system having $N_t$ antennas (here, $N_1$ being a natural number of 2 or greater) with a spatial multiplexing rate of R (here, R being a natural number of 1 or greater). Such may be obtained by using the same method described previously, and can be generalized as the following Equation 13.

$$P_{N_t \times R}^k = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} (U_{N_t \times R}) \quad \text{[Equation 13]}$$

Here, at the right-side of the equal (=) symbol, the phase-shift diagonal matrix is combined with unitary matrix (U) used for a particular purpose that satisfies the following condition: $U_{N_t \times R}^H \times U_{N_t \times R} = I_{R \times R}$. By multiplying the phase-shift diagonal matrix and some unitary matrix, the phase-shift based preceding that satisfies both the power constraint and the orthogonal constraint may be obtained. In addition, the phase-shift based precoding matrix can be generated by multiplying one or more phase-shift diagonal matrices and/or one or more unitary matrices that can be obtained from feedback information or downlink channel state information. In equation 13, the phase-shift diagonal matrix can be implemented by time domain cyclic delay method if the k indicates sub-carrier index.

As an example of the unitary matrix (U), a specific pre-coding matrix for obtaining signal-to-noise ratio (SNR) gain may be used, and in particular, if Walsh codes are used for such pre-coding matrix, the phase-shift based pre-coding matrix generating equation may be as follows:

$$P_{4\times 4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad \text{[Equation 14]}$$

In Equation 14, it is assumed that the system has 4 (physical or virtual) transmit antennas with a spatial multiplexing rate of 4. Here, by appropriately re-forming the unitary matrix (U), a particular transmit antenna may be selected (i.e., antenna selection) and/or the adjusting of spatial multiplexing rate (i.e., rate ES tuning) may be possible.

The following Equation 15 shows an example of how the unitary matrix (U) may be re-formed in order to group 2 antennas of a system having 4 antennas.

$$P_{4\times 4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 0 & 0 & 1 & 1 \\ 0 & 0 & 1 & -1 \\ 1 & 1 & 0 & 0 \\ 1 & -1 & 0 & 0 \end{pmatrix} \quad \text{[Equation 15]}$$

Also, the following Table 3 shows an exemplary method for re-forming the unitary matrix (U) to be appropriate for the corresponding multiplexing rate if the spatial multiplexing rate changes according to time, channel environment, and the like.

TABLE 3

$$P^k_{4\times 4} = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Multiplexing Rate 1, Multiplexing Rate 4, Multiplexing Rate 2

Here, Table 3 shows some examples where column 1, columns 1~2, and columns 1~4 of the unitary is/are selected according to the multiplexing rate, but not meant to be limited to such. For example, if the multiplexing rate is 1, one of the $1^{st}$ through $4^{th}$ columns may be selected, if the multiplexing rate is 2, two particular columns (e.g., one pair among the (1,2), (2,3), (3,4), (1,3), ..., (2,4) pairs of columns) may be selected, and if the multiplexing rate is 4, all columns may be selected.

Alternatively, the unitary matrix (U) may also be provided in codebook format in the transmitting side and the receiving side. In such case, the transmitting side receives index information of the codebook as feedback from the receiving side, then the appropriate unitary matrix (i.e., unitary preceding matrix in a codebook) corresponding to the index is selected from its codebook, and then the above Equation 13 is used to form a phase-shift based pre-coding matrix.

Transceiving Apparatus Supporting a Phase-Shift Based Pre-Coding Method

Figure 9:
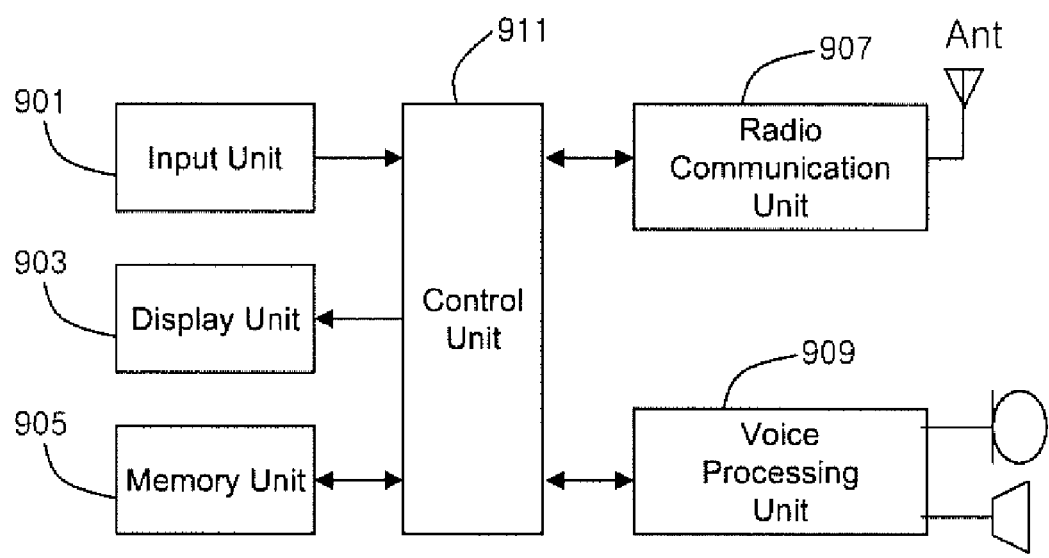
FIG. 9 shows an exemplary block diagram of a transceiving apparatus the supports the phase-shift based pre-coding method.

FIG. 9 is a block diagram of an exemplary structure for a transceiving apparatus that supports the phase-shift based pre-coding method of the exemplary embodiments of the present invention. This exemplary embodiment of the transceiving apparatus assumes that the unitary matrix (U) for forming the phase-shift based pre-coding matrix is provided in codebook format, but is not meant to be limited to such, as described above.

The transceiving apparatus may be comprised of an input unit (901) used to select a desired function or receiving information, a display unit (903) used to show various information in using the transceiving apparatus, a memory unit (905) used to store various programs needed for operating the transceiving apparatus and data to be transmitted to the receiving side, a radio (wireless) communication unit (907) used to receive signals and transmit data to the receiving side, a voice processing unit (909) used to convert and amplify digital voice signals into analog voice signals for outputting through a speaker (SP) and to amplify the voice signals from a microphone (MIC) for converting into digital signals, and a control unit (911) used to control the overall operations of the transceiving apparatus.

Figure 10:
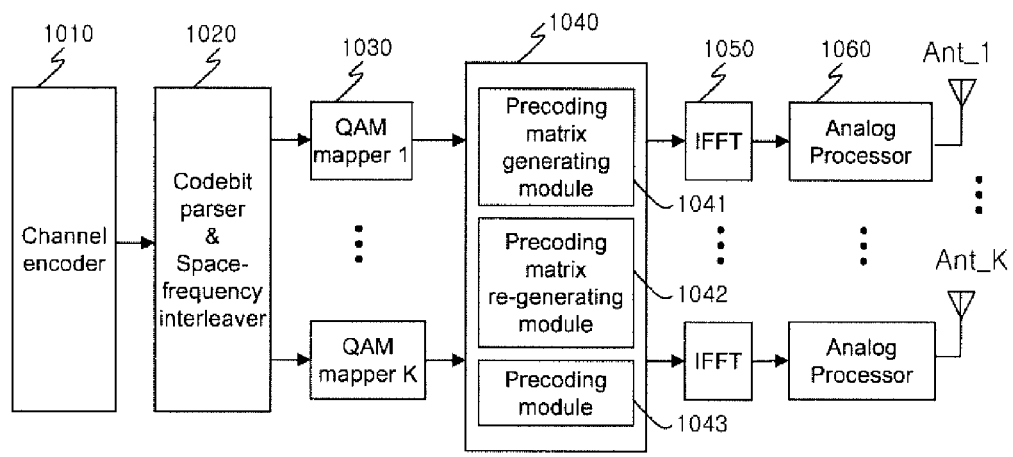
FIG. 10 shows an exemplary block diagram of a SCW OFDM transmitting unit within the radio communication unit of FIG. 9.
Figure 11:
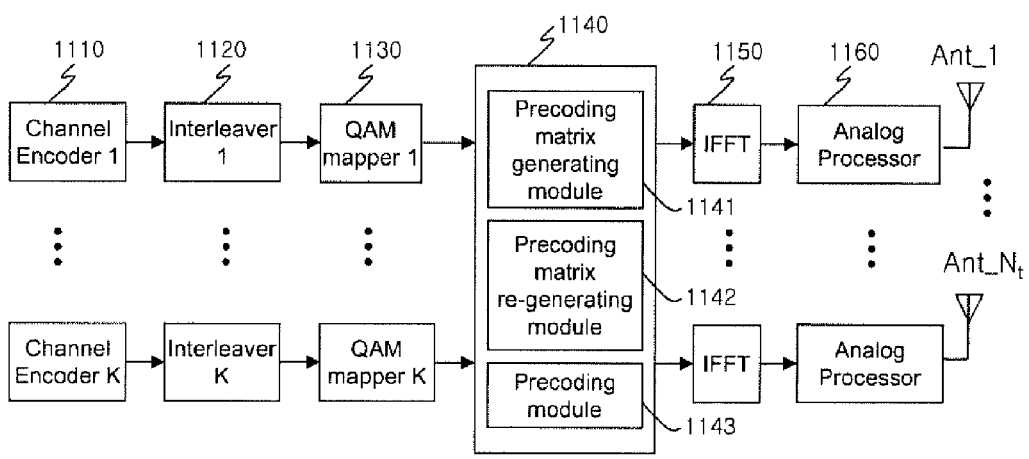
FIG. 11 shows an exemplary block diagram of a MCW OFDM transmitting unit within the radio communication unit of FIG. 9.

The radio communication unit (907) will be explained in more detail as follows. For reference, FIG. 10 is a block diagram showing an exemplary structure of a SCW (Single Codeword) OFDM transmitter unit that is included in the radio communication unit (907), and FIG. 11 shows an exemplary structure of a MCW (Multiple Codeword) OFDM transmitter unit. Also, various receiver units that correspond to each transmitter unit also exist and perform the opposite functions as those of the transmitter units, but their detailed explanations will be omitted merely for the sake of brevity.

In the SCW OFDM transmitter unit, a channel encoder (101) adds redundancy bits to prevent the transmit data from being distorted at (over) the channel, and channel encoding is performed by using error correcting code codes (such as, turbo codes, LDPC codes, and the like). Thereafter, an interleaver (1020) performs interleaving through code bit parsing for minimizing losses due to instantaneous noise during the data transmission procedure, and a mapper (1030) converts the interleaved data bits into OFDM symbols. Such symbol mapping may be performed through phase modulation techniques (such as, QPSK, etc.) and amplitude modulation techniques (such as, 16 QAM, 8 QAM, 4 QAM, etc.). Thereafter, the OFDM symbols are processed through the pre-coder (1040) of the present invention disclosure, then processed through a sub-channel modulator (not shown) and an Inverse Fast Fourier Transform (IFFT) unit (1050) are included into a carrier of the time domain. Upon processing through as filter unit (not shown) and an analog converter (1060), transmission via a radio channel is performed. Meanwhile, at the MCW OFDM transmitter unit, the only difference is that the OFDM symbols are processed through a channel encoder (111) and an interleaver (1120) in a parallel manner for each channel, otherwise, the remaining structural element (1130~1160) may be the same (or similar).

The pre-coding matrix forming module (1041, 1141) determines a reference column corresponding to a first sub-carrier in a particular pre-coding matrix, and the remaining columns are determined by phase-shifting the reference column using a phase angle that is increased by a certain (consistent) amount. Here, a unitary matrix having a size of (number of transmit antennas)×(spatial multiplexing rate) is employed to perform pre-coding, and such unitary matrix is provided for each index of each sub-carrier, whereby the unitary matrix with respect to the first index is phase-shifted to obtain the unitary matrix of each remaining index.

Namely, the pre-coding matrix forming module (1041, 1141) selects a certain $1^{st}$ pre-coding matrix from a codebook previously stored in the memory unit (905). A $2^{nd}$ pre-coding matrix with respect to a sub-carrier or a sub-band of the $2^{nd}$ index is formed by applying a phase-shift of a certain size to the $1^{st}$ pre-coding matrix. Here, the size of the shifted phase may be variously set according to the current channel condition and/or whether or not feedback information from the receiving side exists. A $3^{rd}$ pre-coding matrix with respect to a sub-carrier or a sub-band of the $3^{rd}$ index is formed by performing a phase-shift on the $2^{nd}$ pre-coding matrix. Namely, the forming procedure of the $2^{nd}$ pre-coding matrix is repeated during the formation procedure of the $3^{rd}$ pre-coding matrix through the last pre-coding matrix.

The pre-coding matrix re-forming module (1042, 1142) selects a particular is number of columns (in each pre-coding matrix formed by the pre-coding matrix forming module (1041, 1141)) that corresponds to the given spatial multiplexing rate and deletes the remaining columns in order to re-form a pre-coding matrix. Here, a pre-coding matrix comprised of the above-described selected columns may be newly formed. In selecting the particular column(s) of the pre-coding matrix, one or more random columns may be selected or one or more particular columns may be selected according to pre-defined rules.

The pre-coding module (1043, 1143) performs pre-coding by applying OFDM symbols for the corresponding sub-carrier into each pre-coding matrix determined in the above manner.

Generalized Phase-shift Based Pre-coding Method

Hereafter, the pre-coding matrix determining module (1041, 1141), the pre-coding matrix re-forming module (1042, 1142), and the pre-coding module (1043, 1143) according to another exemplary embodiment will be explained.

The pre-coding matrix determining module (1041, 1141) selects a particular unitary matrix (U) by referring to the unitary matrix index that was fed back from the receiving side or by using a pre-defined matrix, and the selected unitary matrix (U) is applied to the above Equation 13 to determine a phase-shift based pre-coding matrix (P). Here, the phase-shift value of the former matrix of Equation 13 should be previously set.

There may be situations where the spatial multiplexing rate needs to be adjusted due to changes in channel environment or where data transmission needs to be performed by selecting a particular antenna among multiple transmit antennas due to various reasons. In such case, when a change in spatial multiplexing rate and/or a change in the number of antennas is informed from the control unit (911), the pre-coding re-forming module (1042, 1142) searches for a unitary matrix (U) that is appropriate for the corresponding situation or a previously selected unitary matrix (U) is re-formed to be appropriate for the corresponding situation. In the former case, there is the advantage that the desired phase-shift based pre-coding matrix can be quickly obtained because a separate re-forming procedure is not necessary, but there is the disadvantage that memory usage increases because a codebook that is be used for various situations needs to be provided. Also, in the latter case, processing load is created due to the re-forming procedures, but the codebook capacity can be reduced. The unitary matrix re-forming procedure according to spatial multiplexing rate changes or changes in the number of transmit antennas was explained previously with respect to Equation 14 and Table 3.

The pre-coding module (1043, 1143) performs pre-coding by applying the OFDM symbols (with respect to the corresponding sub-carrier or sub-band) to the phase-shift based pre-coding matrix determined in the above manner.

The control unit (911) informs the pre-coding matrix re-forming module (1042, 1142) about various information (such as, the changed spatial multiplexing rate, the changed total number of antennas to be used, etc.) that is used for re-forming the pre-coding matrix.

The transceiving apparatus according to the present invention disclosure may be used in so-called Personal Digital Assistants (PDAs), cellular phones, Personal Communication Service (PCS) phones, GSM phones, WCDMA phones, Mobile Broadband System (MBS) phones, and the like.

By applying both the phase-shift based pre-coding method described herein and the spatial multiplexing method of the background art to a multiple antenna OFDM open loop system that does not employ feedback information, the differences in performance of these two methods will be explained with reference to some experimental test results. Table 4 shows the parameters that were applied to the system for this experimental test.

TABLE 4

| Parameter | Parameter value |
| --- | --- |
| # of sub-carriers | 512 |
| # of guard carriers | 106 (left), 105 (right) |
| # of pilots | 28 (perfect channel estimation) |
| MIMO scheme | Spatial Multiplexing (SM) and phase-shift pre-coding (PSP) |
| MIMO receiver | MMSE (Minimum Mean Squared Error), ML (Minimum Likelihood) |
| Bandwidth | 7.68 MHz |
| Carrier frequency | 2 GHz |
| Channel model | Flat, Ped-A (ITU Pedestrian A), TU (Typical Urban), Mobility: 30 km/h, 250 km/h |

TABLE 4-continued

| Parameter | Parameter value |
| --- | --- |
| # of OFDM a symbols per frame | 8 (localized) |
| MCS (Modulation and Coding Set) | QPSK (Rt = 1/4, R = 1/3. R = 1/2, R = 3/4) |
| Channel coding | 3GPP Turbo (Max-long-MAP), 8 Iterations |
| # of transmit antennas | 2 |
| # of receive antennas | 2 |
| Antenna correlation | (0%, 0%) |

Figure 12:
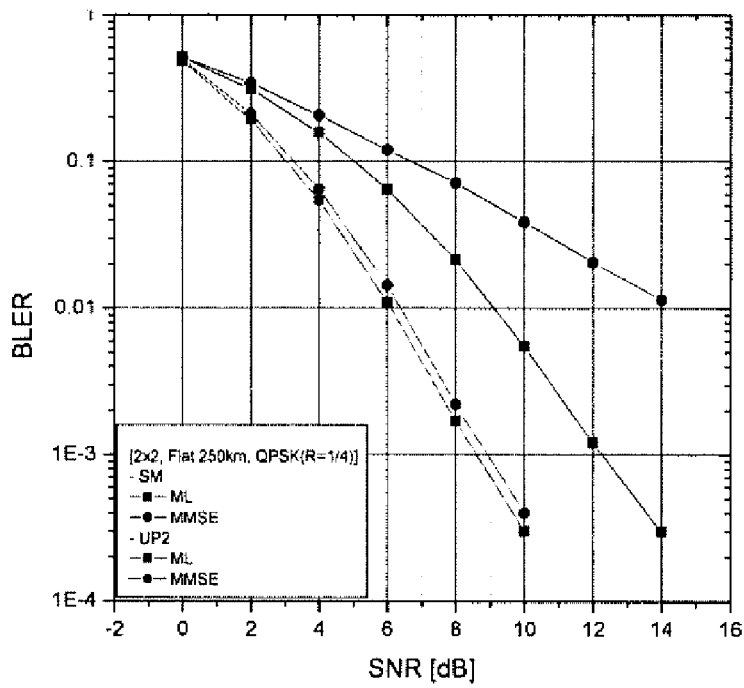
FIG. 12 is a graph showing a comparison in performance differences when the phase-shift pre-coding (PSP) method of the present invention disclosure and the spatial multiplexing (SM) method of the background art are respectively applied to a ML (Minimum Likelihood) receiver and a MMSE (Minimum Mean Squared Error) receiver.

FIG. 12 is a graph showing a comparison in performance differences when the phase-shift-based pre-coding (PSP) method of the present invention disclosure and the spatial multiplexing (SM) method of the background art are respectively applied to a ML (Minimum Likelihood) receiver and a MMSE (Minimum Mean Squared Error) receiver.

As depicted, in a system that applies the PSP method, a larger gain can generally be obtained when compared to the background art spatial multiplexing method. More specifically, in the ML receiver, the PSP method results in slightly more gain when compared to the SM method, but in the MMSE receiver, it can be seen that a larger gain may be obtained with the PSP method as the signal-to-noise ration (SNR) increases.

Figure 13:
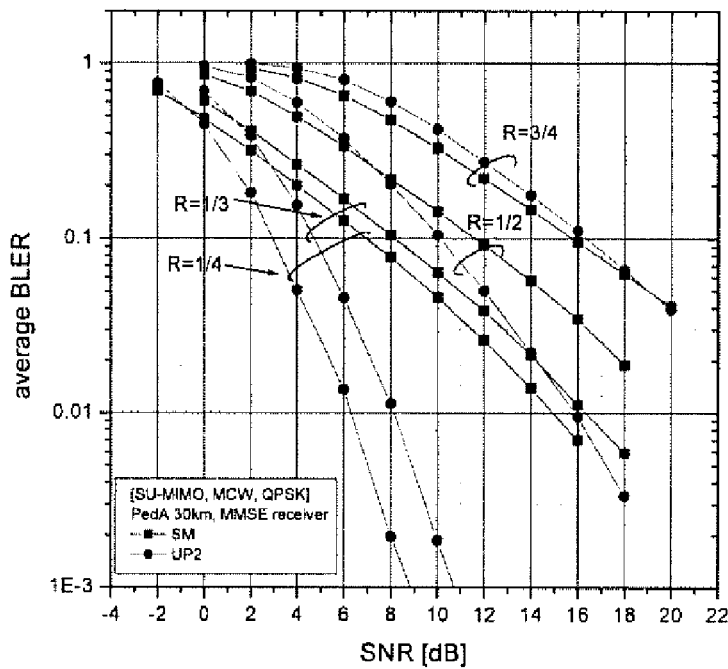
FIGS. 13 and 14 are graphs showing a comparison of the performance differences per coding rate for the phase-shift based pre-coding method of the present disclosure and for the background art spatial multiplexing method being applied to a MMSE (Minimum Mean Squared Error) receiver for a PedA (ITU Pedestrian A) fading channel environment and a TU (Typical Urban) fading channel environment.
Figure 14:
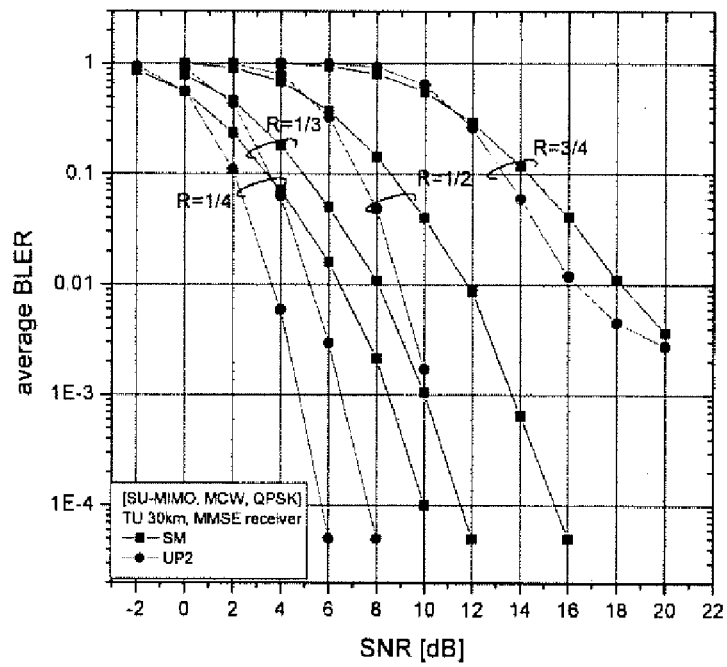

FIGS. 13 and 14 are graphs showing a comparison of the performance differences per coding rate for the phase-shift based pre-coding method of the present invention disclosure and for the background art spatial multiplexing method being applied to a MMSE (Minimum Mean Squared Error) receiver for a Ped-A (ITU Pedestrian A) fading channel environment and a TU (Typical Urban) fading channel environment.

As depicted, it can be seen that on the Ped-A (ITU Pedestrian A) fading channel environment and the TU (Typical Urban) fading channel environment, the PSP method can obtain a large gain by increasing frequency selectivity while decreasing coding rate (R=1/3, R=1/4).

Figure 15:
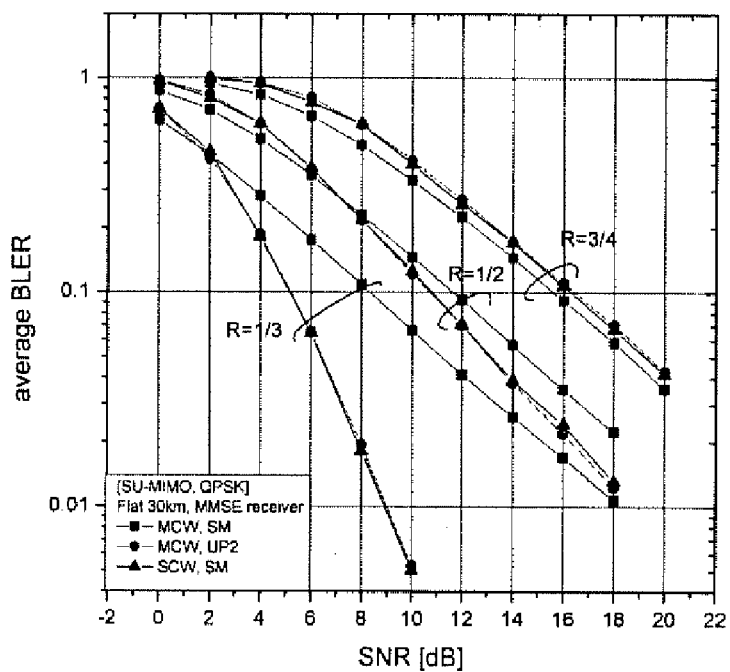
FIGS. 15 through 17 are graphs showing a comparison of the performance differences when the present disclosure phase-shift based pre-coding method and the background art spatial multiplexing method are applied to a system employing SCW (Single CodeWord) and MCW (Multi CodeWord) in a PedA (ITU Pedestrian A) fading channel environment and a TU (Typical Urban) fading channel environment.
Figure 16:
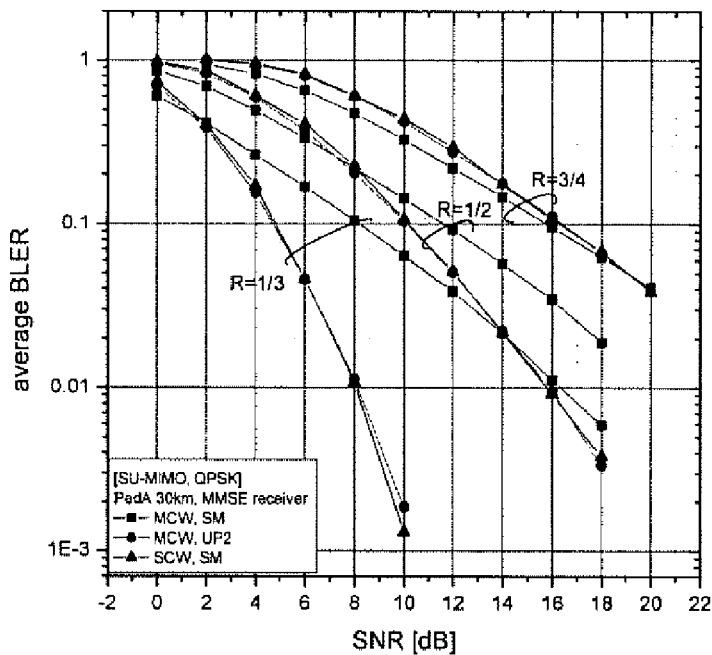
Figure 17:
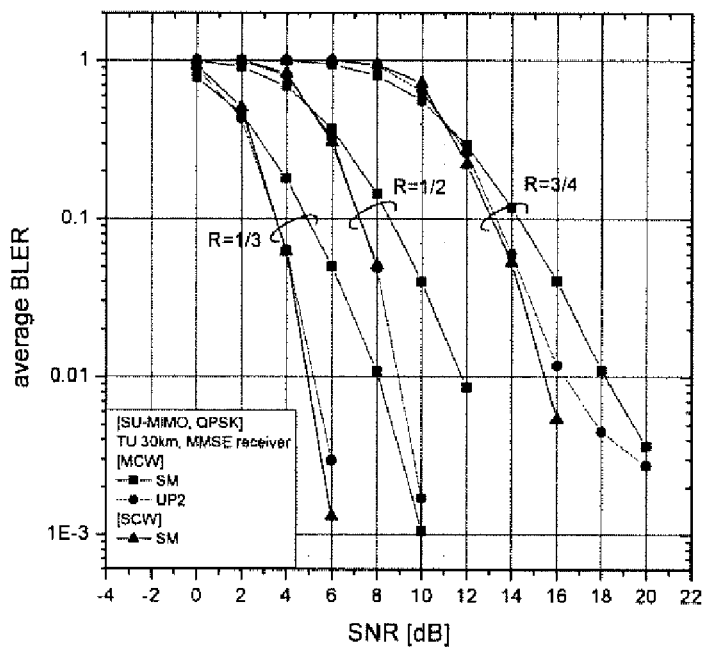

FIGS. 15 through 17 are graphs showing a comparison of the performance differences when the present invention disclosure phase-shift based pre-coding method and the background art spatial multiplexing method are applied to a system employing SCW (Single Codeword) and MCW (Multiple Codeword) in a Ped-A (ITU Pedestrian A) fading channel environment and a TU (Typical Urban) is fading channel environment.

In general, when the spatial multiplexing method is applied to SCW, higher performance compared to that of MCW is achieved, because the channel code can additionally obtain spatial diversity gain and can obtain coding gain due to an increase in codeword length, but has the drawback that reception requires a high degree of complexity. As depicted, in a system with the spatial multiplexing method applied thereto, there is a large difference in performance between SCW and MCW. However, if the present invention disclosure phase-shift based pre-coding method is applied, a larger gain compared to that of the SCW of a system with the spatial multiplexing method applied thereto can be obtained. Namely, as depicted, a much larger gain is generated when phase-shift based pre-coding is applied in comparison to when the background art spatial multiplexing method is applied to MCW, and although a respectively smaller gain is generated compared to when SCW is applied, but it is clear that an improvement in performance is achieved.

Figure 18:
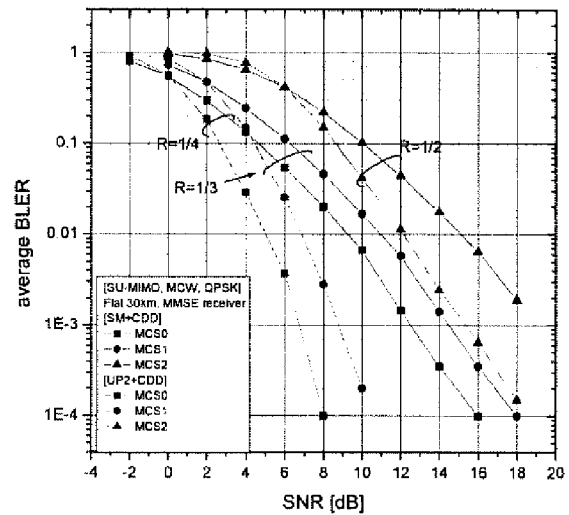
FIG. 18 is a graph showing the performance differences in the cases where the spatial diversity method+cyclic delay diversity method is applied, and the present disclosure phase-shift based pre-coding method+cyclic delay diversity method is applied to a MCS (Modulation and Coding Set) in a flat fading channel environment.

FIG. 18 is a graph showing the performance differences in the cases where the spatial diversity method+cyclic delay diversity method is applied, and the present invention disclosure phase-shift based pre-coding method+cyclic delay diversity method is applied to a MCS (Modulation and Coding Set) in a flat fading channel environment.

As depicted, for all coding rates (R=½, ⅓, ¼), it can be seen that superior performance is achieved when the present invention disclosure phase-shift based pre-coding method+cyclic delay diversity method is applied, compared to when the background art spatial diversity method+cyclic delay diversity method is applied.

As for some exemplary effects of the present invention disclosure that employs the phase-shift based pre-coding method, when compared to the space-time coding method, the degree of complexity of the transceiver is relatively low, the advantages of the phase-shift diversity scheme is maintained while supporting various spatial multiplexing rates. Compared to the pre-coding method, relatively less channel sensitivity and the need for a relatively small capacity codebook can be expected. Furthermore, by using a generalized phase-shift based pre-coding matrix, phase-shift based pre-coding can be easily expanded and applied regardless of the number of transmit antennas in the system.

Figure 19:
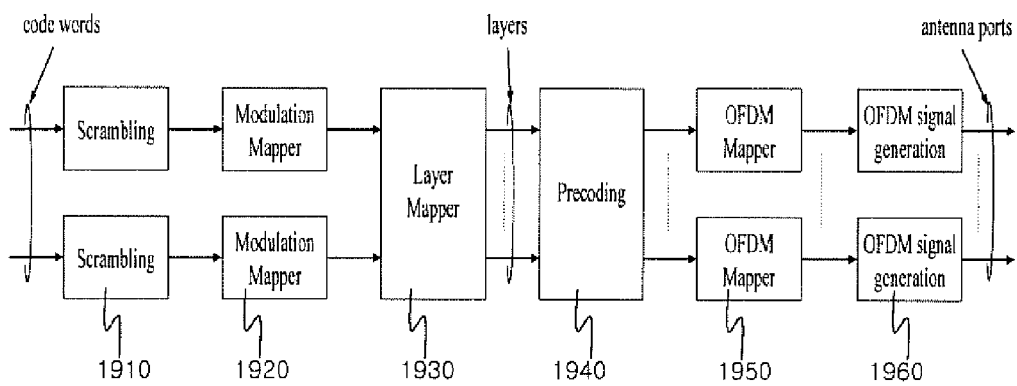
FIG. 19 shows an exemplary overview structure of downlink baseband signal generation according to the present disclosure.

FIG. 19 shows an exemplary overview structure related to downlink baseband signal generation according to the present disclosure.

As for industrial applicability, the features and aspects described herein are related to and can be implemented for various types of radio communication techniques. Some non-limiting examples may include broadband wireless air interface techniques, Multiple-Input Multiple-Output (MIMO) techniques, so-called 3.5 G or 4 G systems designed to provide higher data rates and IP-based data services, etc. and/or various radio communication standards, such as, but not limited to, WCDMA, 3GPP, 3GPP2, OFDM, OFDMA, HSDPA, UMTS, OMA, IEEE 802.11n, IEEE 802.16, etc.

As such, at least some of the features described herein are applicable to such standards that have been developed or that are continuing to evolve. Also, at least some of the features described herein may be implemented in various types of devices (e.g., mobile phones, wireless communication terminals, user equipment (UE), radio communication protocol entities, etc.) in terms of hardware, software, or some appropriate combination thereof.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of transmitting data sequences via two antennas, the method comprising:
    modulating at least one source signal to produce a plurality of modulated symbols;
    inputting the plurality of modulated symbols to a pre-coder;
    performing, at the pre-coder, a phase-shift-based pre-coding of the plurality of modulated symbols using a first matrix $$\frac{1}{\sqrt{2}}\begin{pmatrix} 1 & -e^{j\theta_1 k} \\ e^{j\theta_1 k} & 1 \end{pmatrix}$$

when a multiplexing rate equals 2, and using a second matrix when the multiplexing rate equals 1, the second matrix being a 2×1 matrix and comprising only the first column of the first matrix or the second column of the first matrix,
    wherein k denotes a resource index and $\theta_1$ denotes a phase angle; and
    transmitting the phase-shift-based pre-coded plurality of modulated symbols via the two antennas.

2. The method of claim 1, wherein the first matrix is in a form of a codebook.

3. An apparatus for transmitting data sequences via two antennas, the apparatus comprising:
    a mapper for modulating at least one source signal to produce a plurality of modulated symbols;
    a pre-coder for receiving the plurality of modulated symbols from the mapper and performing a phase-shift-based pre-coding of the plurality of modulated symbols using a first matrix $$\frac{1}{\sqrt{2}}\begin{pmatrix} 1 & -e^{j\theta_1 k} \\ e^{j\theta_1 k} & 1 \end{pmatrix}$$

when a multiplexing rate equals 2, and using a second matrix when the multiplexing rate equals 1, the second matrix being a 2×1 matrix and comprising only the first column of the first matrix or the second column of the first matrix,
    wherein k denotes a resource index and $\theta_1$ denotes a phase angle; and
    a transmitter for transmitting the phase-shift-based pre-coded plurality of modulated symbols via the two antennas.

4. The apparatus of claim 3, further comprising a memory unit for storing the first matrix in a form of a codebook.

* * * * *